US012619805B2

(12) United States Patent
Qvist et al.

(10) Patent No.: US 12,619,805 B2
(45) **Date of Patent: \*May 5, 2026**

(54) METHOD FOR PLANNING A LAYOUT OF A RENEWABLE ENERGY SITE

(71) Applicant: VESTAS WIND SYSTEMS A/S, Aarhus N. (DK)

(72) Inventors: Martin Qvist, Højbjerg (DK); Ana Maria Martinez Fernandez, Aarhus N (DK); Hans Harhoff Andersen, Risskov (DK); Hjalte Vinther Kiefer, Herning (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1067 days.

This patent is subject to a terminal disclaimer.

(21) Appl. No.: 17/766,504

(22) PCT Filed: Sep. 14, 2020

(86) PCT No.: PCT/DK2020/050251
§ 371 (c)(1),
(2) Date: Apr. 4, 2022

(87) PCT Pub. No.: WO2021/063461
PCT Pub. Date: Apr. 8, 2021

(65) Prior Publication Data
US 2024/0054267 A1 Feb. 15, 2024

(30) Foreign Application Priority Data
Oct. 3, 2019 (DK) ............................ PA 2019 70615

(51) Int. Cl.
*G06F 30/27* (2020.01)
*G06F 113/06* (2020.01)
(Continued)

(52) U.S. Cl.
CPC .............. *G06F 30/27* (2020.01); *H02J 3/004* (2020.01); *G06F 2113/06* (2020.01);
(Continued)

(58) Field of Classification Search
CPC .. G06F 30/27; G06F 2113/06; G06F 2119/06; H02J 2300/28; H02J 3/004;
(Continued)

(56) References Cited

U.S. PATENT DOCUMENTS

2005/0192859 A1 9/2005 Mertins et al.
2010/0138201 A1* 6/2010 Gundling ................ F03D 7/026
703/9

FOREIGN PATENT DOCUMENTS

CN 106250656 A 12/2016
CN 110298115 A 10/2019
(Continued)

OTHER PUBLICATIONS

Lianfa Li, "Geographically Weighted Machine Learning and Downscaling for High-Resolution Spatiotemporal Estimations of Wind Speed", University of Chinese Acadaemy of Sciences, Oct. 6, 2019 (Year: 2019).*

(Continued)

*Primary Examiner* — Courtney D Heinle
*Assistant Examiner* — Ryan C Clark
(74) *Attorney, Agent, or Firm* — Patterson + Sheridan, LLP; Gero G. McClellan

(57) ABSTRACT

Correlated sets of historical meteorological data and terrain data are obtained for at least one geographical area. A data model is derived based on the basis of the correlated sets, by training the data model. The trained data model is adapted to identify coherence between meteorological data and terrain data relating to the same geographical area. Meteorological data and terrain data related to the renewable energy site are (Continued)

fed to the trained data model, the terrain data having a higher resolution than the meteorological data. Using the trained model, meteorological data related to the renewable energy site with increased resolution is estimated by downscaling the meteorological data. The estimated meteorological data with increased resolution for the renewable energy site is then used for planning a layout of the renewable energy site.

20 Claims, 4 Drawing Sheets

(51) Int. Cl.
  *G06F 119/06* (2020.01)
  *H02J 3/00* (2006.01)
  *H02J 3/38* (2006.01)

(52) U.S. Cl.
  CPC ........... *G06F 2119/06* (2020.01); *H02J 3/381* (2013.01); *H02J 2203/20* (2020.01); *H02J 2300/28* (2020.01)

(58) Field of Classification Search
  CPC ..... H02J 3/381; H02J 2203/20; F03D 80/002; F05B 2260/82; F05B 2260/84; F05B 2270/709
  See application file for complete search history.

(56) References Cited

FOREIGN PATENT DOCUMENTS

| | | | | | |
|---|---|---|---|---|---|
| EP | 1569153 | A2 | * | 8/2005 | ............... F03D 7/06 |
| EP | 2128441 | A2 | * | 12/2009 | ............. F03D 13/00 |
| EP | 3396571 | A1 | | 10/2018 | |
| WO | WO-0186145 | A1 | * | 11/2001 | ............. F03D 80/00 |
| WO | WO-2020038536 | A1 | * | 2/2020 | ............. F03D 13/30 |
| WO | 2021063461 | A1 | | 4/2021 | |

OTHER PUBLICATIONS

Danish Patent and Trademark Office, 1st Technical Examination including the Search Report and the Search Opinion for Application PA 2019 70615 dated Apr. 17, 2020.

PCT, Notification of Transmittal of the International Search Report and the Written Opinion of the International Searching Authority, or the Declaration for Application PCT/DK2020/050251 dated Nov. 27, 2020.

Lianfa Li, "Geographically Weighted Machine Learning and Downscaling for High-Resolution Spatiotemporal Estimations of Wind Speed," Remote Sensing, vol. 11, No. 11, dated Jun. 10, 2019, pp. 1-26.

Sailor D J et al., "A neural network approach to local downscaling of GCM output for assessing wind power implications of climate changes," Renewable Energy, Pergamon Press, Oxford, GB, vol. 19, No. 3, dated Mar. 1, 2000, pp. 359-378.

Carlini E M et al., "Physical and Statistical Downscaling for wind power forecasting," 2016 International Symposium on Power Electronics, Electrical Drives, Automation and Motion (Speedam), IEEE, Jun. 22, 2016, pp. 338-342.

* cited by examiner

METHOD FOR PLANNING A LAYOUT OF A RENEWABLE ENERGY SITE

FIELD OF THE INVENTION

The present invention relates to a method for planning a layout of a renewable energy site, such as a site of a wind energy plant, using a deep learning algorithm.

BACKGROUND OF THE INVENTION

Knowing the operational conditions, such as wind-related conditions, solar conditions, etc., for an area of interest during planning of a renewable energy site, such as a wind energy plant or a solar energy plant, is of maximum relevance. In some cases, such operational conditions have previously been obtained by means of simulations, e.g. performed using large data sets of relevant historical information regarding the operational conditions. The simulations could, e.g., include downscaling of the data. However, such simulations are quite computationally expensive and may take several hours to be completed. The more data to be processed, the more time consuming simulations may be expected to be, and this may further increase the needs for computing power. Factors such as the complexity of the terrain of the area of interest and/or the target resolution of the downscaled data may further increase the simulation time.

One approach for downscaling large data sets is referred to as dynamical downscaling. Dynamical downscaling requires running high-resolution climate models on a regional sub-domain, using observational data or lower-resolution climate model output as a boundary condition. These models use physical principles to reproduce local climates, but are computationally expensive.

Another approach is downscaling using statistical methods. Statistical downscaling is a two-step process in which statistical relationships between local climate variables, such as surface aft temperature, precipitation, etc., and large-scale predictors, such as pressure fields, are initially developed, and the relationships are subsequently applied to outputs of global climate model experiments in order to simulate local climate characteristics in the future. This approach is computationally less expensive than the dynamical downscaling approach, but is not reliable, since it can not guarantee a reasonable result for every simulation.

DESCRIPTION OF THE INVENTION

It is an object of embodiments of the invention to provide a method for planning a layout of a renewable energy site in a fast and reliable manner.

It is further an object of embodiments of the invention to provide a method for planning a layout of a renewable energy site in a computationally inexpensive manner.

According to a first aspect the invention provides a method for planning a layout of a renewable energy site, the method comprising the steps of:

obtaining, for at least one geographical area, correlated sets of historical meteorological data and terrain data, relating to the respective geographical area(s), deriving a data model using a deep learning algorithm, and on the basis of the correlated sets of historical meteorological data and terrain data, by training the data model, the trained data model being adapted to identify coherence between meteorological data and terrain data relating to the same geographical area, feeding meteorological data and terrain data related to the renewable energy site to the trained data model, the terrain data having a higher resolution than the meteorological data, obtaining estimated meteorological data related to the renewable energy site with increased resolution by downscaling the meteorological data, using the trained data model, and based on the data fed to the trained data model, and planning the layout of the renewable energy site on the basis of the estimated meteorological data with increased resolution for the renewable energy site.

Thus, according to the first aspect, the invention provides a method for planning a layout of a renewable energy site. In the present context the term 'renewable energy site' should be interpreted to mean a collection of two or more renewable energy generating units, such as wind turbines, photovoltaic cells, etc., arranged within a limited geographical area, and which may share various forms of infrastructure, such as access roads, communication network, substations, power electronics, grid connections, etc.

In the present context, the term 'renewable energy generating' unit should be interpreted to mean a unit which is capable of generating electrical power, and which supplies all or part of the produced power to a power grid.

In the method according to the first aspect of the invention, correlated sets of historical meteorological data and terrain data, relating to at least one geographical area are initially obtained, Thus, for each geographical area, information regarding historical meteorological conditions occurring in that geographical area, as well as information regarding terrain in that geographical area is obtained. For a given geographical area, the historical meteorological data thereby forms one part of the correlated set of data and the terrain data forms the other part of the correlated set. Such correlated sets of data may be obtained for one geographical area only, or they may be obtained for several different geographical areas. In the latter case, information regarding historical meteorological data and terrain data is obtained for various geographical areas, wherein the various geographical areas may have different meteorological conditions and terrains with various physical features. This increases the total amount of correlated information available.

The historical meteorological data may represent the conditions of the atmosphere for a specific past time interval of the respective geographical areas, and may comprise information, such as temperature, air pressure, humidity, precipitation, wind speed, wind direction, solar influx, etc.

The terrain data may represent the physical features of the respective geographical areas, and may comprise information regarding the vertical and horizontal dimension of the land surface. This may be expressed in terms of the elevation, roughness, slope, orientation of terrain features, etc. The terrain features may comprise, but are not limited to, hills, ridges, valleys, saddles, cliffs, vegetation, etc.

Next, a data model is derived using a deep learning algorithm, and on the basis of the correlated sets of historical meteorological data and terrain data, by training the data model. The trained data model is adapted to identify coherence between meteorological data and terrain data relating to the same geographical area. Thus, the obtained correlated sets of data for at least one geographical area are used for training a data model that is adapted to find similarities between data sets relating to the same geographical area.

The data model may be able to organise the data sets and standardise how they relate to one another, i.e. how the meteorological data relate to the terrain data. For instance, the training process may reveal whether or not, at to which extent certain terrain features may influence certain meteorological features. For instance, the presence of a hill may influence a wind pattern in the vicinity of the hill, e.g. depending on wind direction and wind speed.

The data model is trained using the deep learning algorithm, wherein the deep learning algorithm allows the modelling of the data model by training based on the correlated sets of data. Deep learning is a class of machine learning that uses neural networks composed of several layers. Neural networks are sets of algorithms, which are designed to recognise patterns. Each layer's output is simultaneously the subsequent layer's input, starting from an initial input node receiving one or more data sets. Each layer trains on a distinct set of features based on the previous layer's output. Thus, the deep learning algorithm uses multiple layers to progressively extract higher level features.

Thus, the deep learning algorithm allows deriving of a data model, which is able to continuously improve itself based on data provided thereto, and which is capable of identifying patterns and coherence in the provided data. Furthermore, the deep learning algorithm is capable of doing this in a fast and reliable manner.

Thus, since the data model of the claimed invention is trained based on correlated sets of historical meteorological data and terrain data, the trained data model is capable of identifying patterns in this kind of data, i.e. it is capable of deriving a coherence between the meteorological data and the terrain data of a given geographical area.

Accordingly, upon completion of the training step, a trained model is available which is able to recognise patterns in correlated sets of meteorological data and terrain data, and thereby identify correspondence between meteorological data and terrain data relating to the same geographical area.

Next, meteorological data and terrain data related to the renewable energy site are fed to the trained data model, the terrain data having a higher resolution than the meteorological data. Thus, a correlated set of meteorological data and terrain data for a candidate renewable energy site is obtained, and the correlated set of data for the renewable energy site is provided to the data model. Furthermore, the terrain data fed to the trained model has a higher resolution than the meteorological data fed to the trained model.

The resolution of the meteorological data and terrain data related to the renewable energy site may refer to a distance between spatial points within the renewable energy site where information has been obtained, or which the information relates to. The spatial points within the renewable energy site may refer to the points at which measurements are taken in the renewable energy site. A low resolution indicates that the distances between adjacent measurement points are large, while a high resolution indicates that the distances between adjacent measurement points are small.

For instance, for low resolution data sets, the distance between adjacent measurement points may be, e.g. 3 km, 5 km, 7 km or larger. For higher resolutions the distance between adjacent measurement points may be smaller than, e.g., 3 km. The smaller the distance between adjacent measurement points, the higher the resolution will be.

Alternatively or additionally, the resolution of the meteorological data and terrain data related to the renewable energy site may refer to a temporal resolution, i.e. a resolution with respect to time. The temporal resolution within the renewable energy site may refer to the rate at which measurements are obtained in the renewable energy site. A low resolution indicates that measurements are obtained at long time intervals, while a high resolution indicates that measurements are obtained at short time intervals.

For instance, for low resolution data sets, measurements may be obtained at most every hour. For higher resolutions, measurements may be obtained every 30 minute or even more often.

Thus, terrain data with a higher resolution compared to the meteorological data indicates a more detailed data set comprising more information regarding the physical features of the renewable energy site, compared to the information regarding the meteorological conditions of the renewable energy site.

Since the meteorological data and terrain data for the renewable energy site are fed to the trained model, the trained model is capable of recognising patterns in the meteorological data and terrain data for this site, and thereby identifies correspondence between meteorological data and terrain data for the renewable energy site.

Next, estimated meteorological data related to the renewable energy site with increased resolution is obtained by downscaling the meteorological data, using the trained data model, and based on the data fed to the trained data model.

As described above, the trained data model is suitable for identifying the coherence between meteorological data and terrain data relating to a geographical area. Thus, by feeding meteorological data and terrain data related to a renewable energy site to the trained data model, coherence between meteorological data and terrain data relating to the renewable energy site is obtained. The coherence may then be used for estimating meteorological data related to the renewable energy site with an increased resolution by downscaling the meteorological data for the renewable energy site.

The estimation may include increasing the resolution of the meteorological data by increasing the number of data points in the meteorological data. The number of data points may be increased by estimating further data points based on the terrain data. Since the terrain data has a higher resolution than the meteorological data to begin with, the data model may use the meteorological data and terrain data to identify the coherence between the two data sets, and thereby estimate further data points for the meteorological data.

Thus, the resolution of the meteorological data related to the renewable energy site, which was fed to the data model together with the terrain data related to the renewable energy site, is improved by estimating meteorological data using the data model and based on the data fed to the trained data model. The estimation is performed by downscaling the meteorological data using the trained data model, and based on the data fed to the trained data model.

Downscaling is a procedure to derive data with increased resolution from data with low resolution. Thus, downscaling refers to an increase in resolution of data of the geographical area, i.e. the renewable energy site.

Thus, the trained data model may be used for estimating information regarding meteorological conditions at the renewable energy site with an increased resolution by downscaling meteorological data on the basis of terrain data with higher resolution than the meteorological data.

Finally, a layout of the renewable energy site is planned on the basis of the estimated meteorological data with increased resolution for the renewable energy site.

Thus, the estimated meteorological data is used for planning the layout of the renewable energy site, i.e. planning the positions of renewable energy generating units in the renewable energy site. The estimated meteorological data may give a detailed overview of the meteorological conditions in the renewable energy site, and thus enabling the planning of the layout of the renewable energy site in an optimal manner.

For instance, in the case that the renewable energy site comprises wind turbine generators, the renewable energy site may be planned in such a manner that the wind turbine generators have the optimal conditions for generating power from the wind.

In the case that the renewable power plant is a hybrid power plant comprising, e.g., wind turbine generators and photovoltaic cells, the renewable energy site may be planned in such a manner that each of the renewable energy generating units have the optimal conditions for generating power from the wind and sun.

Thus, by planning the layout of the renewable energy site based on the estimated meteorological data with increased resolution, it may be ensured that the energy generating units of the renewable energy site may have optimal conditions for generating power.

It is an advantage that the data model is derived using the deep learning algorithm. The deep learning algorithm offers a fast and reliable manner of training a data model based on correlated sets of data due to the use of neural networks composed of several layers, each layer progressively extracting higher level features of the correlated sets of data. Thereby, a trained data model that can identify the coherence between meteorological data and terrain data for a geographical area may be determined in a computationally inexpensive manner.

Since the data model is derived in a reliable manner, the resulting trained data model will also be reliable. The downscaling of meteorological data, i.e. increasing the resolution of the meteorological data, based on terrain data of higher resolution than the meteorological data uses the trained data model, hence the estimated meteorological data for the renewable energy site will also be reliable. Thereby, the layout of the renewable energy site may be planned in a reliable and computationally inexpensive manner.

Furthermore, since a data model may be derived in a computationally inexpensive manner, it may be possible to apply the data model to several candidate geographical areas. Furthermore, it may be possible to estimate meteorological data for each candidate geographical area, such that the most suitable geographical area for planning the layout of the renewable energy site is chosen. Thereby, a screening process can be performed without requiring excessive computing power.

The step of obtaining terrain data may comprise obtaining elevation data. According to this embodiment, the obtained terrain data for each of the geographical areas comprises information regarding the height above or below a fixed reference point, such as the sea level, of the geographic area, as well as variations in elevation across the site.

For instance, hills and valleys may affect the wind pattern across a site, e.g. in terms of wind speed, turbulence, etc. For instance, the wind speed may increase on an upstream side of a hill and decrease on a downstream side of the hill. Furthermore, hills and valleys may create turbulence. Such coherence between meteorological data and elevation data can be derived for a specific site by the trained data model.

Alternatively, or additionally, the step of obtaining terrain data may comprise obtaining roughness data. The roughness may define the properties of the surface geometry of the geographical area. The properties of the surface geometry of the geographical area may vary depending on the landscape, vegetation, etc. These properties may affect the meteorological conditions, such as the wind speed, at the geographical area.

For instance, vegetation, such a forest, shrubbery, etc., may affect the wind pattern across a site, similarly to the impact by hills and valleys described above. Furthermore, building or similar structures may also affect the wind pattern in this manner. Such coherence between meteorological data and roughness data can be derived for a specific site by the trained data model.

The historical meteorological data may comprise high resolution historical meteorological data. According to this embodiment, the distances between adjacent measurement points of the historical meteorological data are small, hence a more detailed data set comprising more information regarding the historical meteorological conditions of the geographical area is obtained.

Thus, by obtaining high resolution historical meteorological data, the data model may, during training, be able to find the coherence between meteorological data and terrain data in a faster manner, and thereby reduce the computational time required to train the data model. Furthermore, it may be expected that the resulting trained data model is more accurate when it has been trained using high resolution data.

Alternatively or additionally, the terrain data may comprise high resolution terrain data. In this case, a more detailed data set comprising more information regarding the physical features of the geographical area is obtained. Thereby, the data model may, during training, be able to find the coherence between meteorological data and terrain data in a faster manner, and thereby reduce the computational time required to train the data model, as well as increasing the accuracy of the trained model.

The historical meteorological data may be in the form of one or more time series. A time series may be a series of data points indexed, listed or graphed in time order, Most commonly, a time series is a sequence taken at successive points in time. The points in time may be equally spaced. Thus, the historical meteorological data may be a series of values of a quantity obtained at successive times, such as approximately every 30 minutes, 1 hour, 1 day, etc., and may have equal time intervals between them.

Thus, time series of historical meteorological data may describe the development of the meteorological conditions over time of a geographical area. The knowledge regarding the development of the meteorological conditions may be useful during training the data model, since the data model may be trained to find the coherence between various meteorological conditions and the terrain data over time. Since the terrain data are expected to be substantially the same over time, on the time scale in question, only the historical meteorological data are in form of time series. Thereby, using the knowledge regarding the development of the meteorological conditions during training of the data model, a more reliable data model may be derived. Furthermore, since the historical meteorological data is in the form of time series, output of the trained data model is also in the form of time series.

The method may comprise the step of estimating an energy production of the renewable energy site based on the estimated meteorological data with increased resolution for the renewable energy site and based on the layout of the renewable energy site, Thus, according to this embodiment, the detailed knowledge of the meteorological conditions across the renewable energy site, which was obtained by means of the trained data model, as well as knowledge regarding the position of individual energy generating units within the renewable energy site, provided by the planned layout, are used for estimating the total energy production which can be provided by the planned renewable energy site.

The estimated energy production may be a measure of the amount of energy that may be produced by the renewable energy site. In the case that the renewable energy site comprises renewable energy generating units, such as wind turbines, the energy production may, in particular, depend on estimated meteorological data, such as wind speed and wind direction, at the positions of each wind turbine.

In the case that the renewable energy site comprises renewable energy generating units, such as photovoltaic cells, the energy production may, in particular, depend on estimated meteorological data, such as solar influx, at the positions of each photovoltaic cell.

Furthermore, the estimated energy production may be a maximum or a minimum energy production that may be produced by the renewable energy site.

Based on the estimated energy production of the renewable energy site, a renewable energy site owner may be able to determine whether or not he/she would be interested in constructing the renewable energy site.

The method may further comprise the step of constructing the renewable energy site in accordance with the layout of the renewable energy site. Thus, renewable energy generating units of the kind or kinds specified by the layout are in fact erected at the positions within the site, which are specified by the layout.

The method may further comprise the steps of:

operating the renewable energy site for a predefined time period, obtaining meteorological data during the renewable energy site during the predefined time period, feeding the meteorological data obtained during the predefined time period to the trained data model, obtaining estimated meteorological data related to the renewable energy site and to the predefined time period with increased resolution by downscaling the meteorological data using the trained data model, and based on the terrain data previously fed to the trained data model, and estimating an expected energy production of the renewable energy site for the predefined time period, based on the estimated meteorological data with increased resolution for the renewable energy site for the predefined time period.

Thus, once the renewable energy site has been constructed, it is operated for a predefined time period. The predefined time period may be defined by different time scales, ranging from several days to months or even a year. During the predefined time period, meteorological data is obtained at the site of the constructed renewable energy site, and fed to the trained data model, similarly to what was performed during planning of the renewable energy site.

Thereafter, the resolution of the meteorological data related to the renewable energy site and obtained during the predefined time period, which was fed to the trained data model, is improved by estimating meteorological data using the data model and based on the terrain data previously fed to the trained data model, the terrain data having a higher resolution than the meteorological data. The estimation is performed by downscaling the meteorological data obtained during the predefined time period using the trained data model, and the terrain data related to the renewable energy site previously fed to the data model. This estimation may be similar to what was performed during the planning of the renewable energy site.

Thus, information regarding the meteorological conditions at the renewable energy site with an increased resolution is estimated for meteorological data related to the predefined time period.

Finally, the estimated meteorological data related to the renewable energy site is used for estimating an expected energy production, e.g. in the manner described above, and used during planning of the renewable energy site.

The estimated expected energy production of the renewable energy site for the predefined time period may be compared with what was actually produced in the same predefined time period. The comparison may be used for determining whether or not the estimated expected energy production is in accordance with what was actually produced. The comparison may be used for identifying the energy generating units that are not performing satisfactorily, and thereby identify possible issues within the renewable energy site. Furthermore, in the comparison may be used for troubleshooting the data model, in the case that there is a large deviation between the estimated expected energy production and the actual production. Finally, the comparison may reveal that the meteorological conditions during the predefined time period differ from expected standard meteorological conditions, and that this may be the cause of a discrepancy between the expected energy production and the actual energy production.

The renewable energy site may comprise at least one wind turbine generator. A wind turbine generator is an energy generating unit that converts the mechanical rotational power produced by the wind to electrical power. The wind turbine generator will normally have a tower carrying a nacelle, the nacelle carrying a rotor and a set of wind turbine blades mounted thereon. The nacelle may comprise electrical devices, such as a generator, power electronics, etc. The nacelle may further be mounted on top of the tower, but may also be mounted on other parts of the tower, e.g. in the case that the wind turbine is a multirotor wind turbine comprising two or more rotors. The wind turbine generator may be a stand alone wind turbine generator, or it may form part of a wind farm comprising two or more wind turbines generators.

Thus, for a renewable energy site comprising at least one wind turbine generator, it may be important to have knowledge regarding the coherence between the meteorological conditions, notably the wind conditions, and the physical conditions of the renewable energy site in order to plan the layout of such a renewable energy site. In particular, it is relevant to know how the meteorological conditions vary across the site, in coherence with the terrain conditions, in order to select optimal positions for the wind turbine generators within the site. Thereby, it may be ensured that the renewable energy site may be planned in such a manner that the renewable energy generating units, in this case the wind turbine generators, are positioned and constructed such that they have the optimal conditions for generating power from the wind.

Alternatively or additionally, the renewable energy site may comprise at least one energy generating unit of another kind, such as one or more photovoltaic cells, hydroelectric generators, etc.

The deep learning algorithm may comprise one or more help functions for deriving the data model, the one or more help functions being adapted to provide information regarding a vector field defined by the historical meteorological data.

The vector field is an assignment of a vector to each point in a subset of space. For instance, a vector field in a plane can be visualised as a collection of arrows with a given magnitude and direction, each attached to a point in the plane. A wind field acts as a vector field, defining direction and magnitude of the wind across a geographical area.

A vector field may be described by means of vector operators, i.e. help functions. These help functions are differential operators used in vector calculus and include, but are not limited to, divergence ($\nabla \cdot F$), curl ($\nabla \times F$) and laplacian ($\nabla^2 F$).

The curl is a vector operator that described the rotation of a vector field. At every point in the vector field, the curl of that point is represented by a vector having a magnitude and direction that characterises the rotation at that point. Thus, for a wind field, the curl may describe the rotation of the wind at a point within the wind field. This rotation of the wind may for instance be turbulence.

Divergence is "flux density" indicating the amount of flux entering or leaving a point. The flux is the amount of, e.g., wind, passing through a surface. The flux may expand (positive divergence) or contract (negative divergence). For a wind field, positive divergence may occur at a position which wind is guided towards, e.g. a narrow passage between two structure, two hills, etc. Similarly, negative divergence may occur at positions which wind is directed away from.

The laplacian is given by the divergence of the gradient of a vector field. Thus, the laplacian of a wind field may describe the net rate at which a wind moves toward or away from some point. This movement of the wind may for instance be compression of the air due to the wind flow.

Since, all help functions are differential operators closely related to the behaviour of the wind flow, they provide information to the deep learning algorithm, thus helping the algorithm during training of the data model.

The meteorological data may comprise wind data and/or solar influx data. Thus, according to this embodiment, the meteorological data obtained for at least one geographical area and/or for the renewable energy site may comprise data regarding the wind conditions and/or solar radiation at the relevant geographical area. The data regarding wind conditions could, e.g., include data regarding wind speed, wind direction, dominating wind direction, turbulence conditions, gust conditions, etc. The data regarding solar influx could, e.g., include solar angle, daylight hours, cloud conditions, etc.

In the case that the renewable energy generating unit is a wind turbine generator, the energy generation is dependent on the wind conditions at the position of the renewable energy generating unit, notably the wind speed and the wind direction. Thus wind data may be important for estimating an expected energy production of the renewable energy generating unit and/or for the whole renewable energy site.

In the case that the renewable energy generating is a photovoltaic cell, the energy generation is dependent on solar influx, notably daylight hours, cloud conditions, etc. Thus solar influx data may be important for estimating an expected energy production of the renewable energy generating unit and/or for the whole renewable energy site.

Alternatively or additionally the meteorological data may comprise meteorological data such as temperature, air pressure, humidity, precipitation etc.

The deep learning algorithm may comprise convolutional network models, recurrent neural networks, generative adversarial network models and/or feed forward models. Thus, it may be possible to use a deep learning algorithm comprising a variety of models.

Convolutional network models are characterised by the use of convolution operations in place of general matrix multiplication in at least one of their layers. Convolutional network models use convolution and pooling operations to detect different hierarchy of features in data by sliding a filter over the input data to create a feature map. Convolutional network models are further characterised by having neurons in each layer that are not connected to all the neurons in the next layer but only to a small region of it.

Recurrent neural network models are characterised by taking as their input not just the current input, but also what they have perceived previously in time. Thus, recurrent neural networks learn similarly while training, in addition, they remember things learnt from prior input(s) while generating output(s).

Generative adversarial network models are characterised by an unsupervised training that involves automatically discovering and learning the regularities or patterns in input data in such a way that the data model can be used to generate or output new examples that plausibly could have been drawn from the original dataset.

Feed forward models are characterised by having no feedback connections such that the output of the network is fed back into itself. Thus, the information only travels forward in the neural network, through the input nodes then through the one or more layers and finally through the output nodes. Feed forward models are further characterised by the use of multilayer perceptrons. Multilayer perceptrons usually mean fully connected networks, that is, each node in one layer is connected to all nodes in the next layer.

The correlated sets of historical meteorological data and terrain data may be obtained from at least two different geographical areas. Thus, according to this embodiment, the data sets which are used for training the model are obtained from various geographical areas, which may have different meteorological conditions and/or terrains with various physical features. This increases the total amount of correlated information available, as well as the variation in the available data. The available information used for training the data model provides a better and faster training of the data model, and may increase the accuracy of the trained data model.

According to a second aspect, the invention provides a method for identifying a renewable energy site, the method comprising the steps of:

obtaining, for at least one geographical area, correlated sets of historical meteorological data and terrain data, relating to the respective geographical area(s), deriving a data model using a deep learning algorithm, and on the basis of the correlated sets of historical meteorological data and terrain data, by training the data model, the trained data model being adapted to identify coherence between meteorological data and terrain data relating to the same geographical area, feeding meteorological data and terrain data related to at least one geographical area to the trained data model, each geographical area comprising at least one candidate renewable energy site, the terrain data having a higher resolution than the meteorological data, obtaining estimated meteorological data related to the geographical area(s) with increased resolution by downscaling the meteorological data, using the trained data model, and based on the data fed to the trained data model, and identifying at last one suitable renewable energy site within the at least one geographical area on the basis of the estimated meteorological data with increased resolution for the geographical area(s).

It should be understood, that a skilled person would readily recognise that any feature described in combination with the first aspect of the invention could also be combined with the second aspect of the invention, and vice versa.

The method according to the second aspect of the invention is very similar to the method according to the first aspect of the invention, in the sense that a data model is trained in the manner described above with reference to the first aspect of the invention.

However, in the method according to the second aspect of the invention, once the data model has been trained, meteorological data and terrain data related to at least one geographical area are fed to the trained data model. Each of the geographical area(s) comprises at least one candidate renewable energy site, and the terrain data has a higher resolution than the meteorological data.

Thus, instead of feeding data related to a specific selected renewable energy site to the trained model, data relating to at least one geographical area, which is not necessarily suitable for accommodating a renewable energy site, is fed to the trained data model. The term 'geographical area' should be understood in the manner described above with reference to the first aspect of the invention.

The data may relate to a single large geographical area covering one or more candidate renewable energy site. Alternatively, the data may relate to several smaller geographical areas, each covering one or more candidate renewable energy sites.

In the present context the term 'candidate renewable energy site' should be interpreted to mean a limited area which may qualify as a future renewable energy site.

The number of candidate renewable energy sites within a given geographical area may, e.g., depend on the size of the area covered by the geographical area. For instance, a geographical area covering a wide area may comprise several candidate renewable energy sites, whereas a geographical area covering a smaller area may comprise only a single candidate renewable energy site. However, in the latter case, two or more geographical areas may advantageously be applied.

The resolution of the meteorological data and terrain data related to the at least one geographical area should be understood in the manner described above with reference to the first aspect of the invention.

The data fed to the trained data model is processed in the manner described above with reference to the first aspect of the invention, thereby obtaining estimated meteorological data with increased resolution for each of the geographical areas. However, since the data fed to the trained data model relates to unspecified geographical area(s), as described above, instead of to a specific renewable energy site, the estimated meteorological data relate to a wider geographical coverage, including sites which may be suitable for erecting a renewable energy site.

Finally, the estimated meteorological data with increased resolution for the geographical area(s) is used for identifying at least one suitable renewable energy site among the candidate renewable energy sites within the geographical area(s). Thus, instead of planning a layout of a renewable energy site, the process described above with reference to the first aspect of the invention is used for identifying sites which may be suitable or promising for erecting a renewable energy site, e.g. as part of a pre-screening process. For instance, very unsuitable candidate sites may be discarded, and a smaller number of possible sites may be subjected to further investigations in order to eventually identify the site which is most suited for the purpose.

When applying the method according to the second aspect of the invention, the resolution of the downscaled meteorological data may not need to be as high as it is required when applying the method according to the first aspect of the invention, because the information required in order to evaluate the suitability of a candidate site may not need to be as detailed as the information required in order to plan a layout of a renewable energy site.

The method according to the second aspect of the invention thereby provides a fast and efficient manner of pre-screening candidate sites.

BRIEF DESCRIPTION OF THE DRAWINGS

The invention will now be described in further details with reference to the accompanying drawings, in which.

DETAILED DESCRIPTION OF THE DRAWINGS

Figure 1:
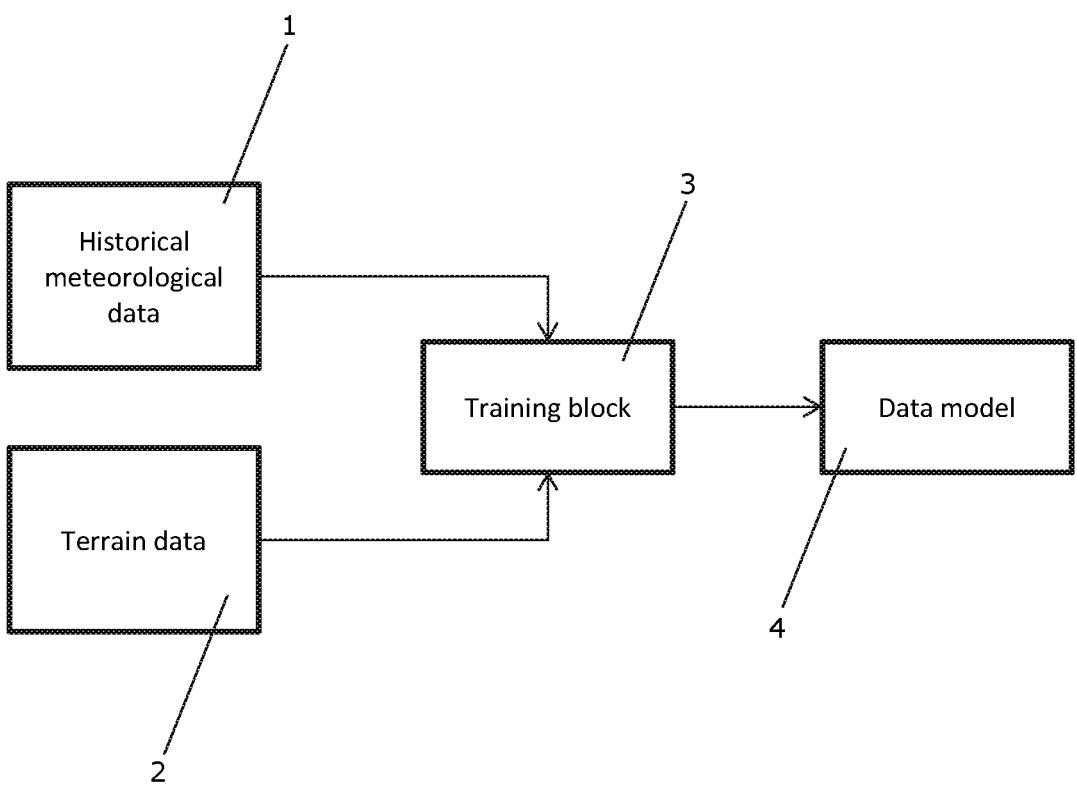
FIG. 1 is a block diagram illustrating a method according to an embodiment of the invention.

FIG. 1 is a block diagram illustrating a method according to an embodiment of the invention, Correlated sets of historical meteorological data 1 and terrain data 2 related to at least one geographical area are provided to a training block 3. Correlated sets of data may be obtained from various geographical areas, which may have different meteorological conditions and terrains with various physical features. The historical meteorological data 1 may represent the conditions of the atmosphere for a specific past time interval for at least one area, and may comprise information, such as temperature, air pressure, humidity, precipitation, wind speed, wind direction, solar influx, etc. The terrain data 2 may represent the physical features of the respective geographical areas, and may comprise information regarding the vertical and horizontal dimension of the land surface. Thus, for a given geographical area, the historical meteorological data forms one part of the correlated set of data and the terrain data forms the other part of the correlated set.

Based on the received data, the training block 3 derives a data model 4 using a deep learning algorithm, and on the basis of the correlated sets of historical meteorological data 1 and terrain data 2, by training the data model 4. Deep learning is a class of machine learning that uses neural networks composed of several layers. Neural networks are sets of algorithms, which are designed to recognise patterns. Each layer trains on a distinct set of features based on the previous layer's output. Thus, the deep learning algorithm uses multiple layers to progressively extract higher level features.

The data model 4 may be able to organise the data sets and standardise how they relate to one another, i.e. how meteorological data for a given geographical area relate to terrain data for the same geographical area. For instance, the training process may reveal whether or not, and to which extent certain terrain features may influence certain meteorological features, Thus, the trained data model 4 is adapted to identify coherence between meteorological data and terrain data relating to the same geographical area.

Figure 2:
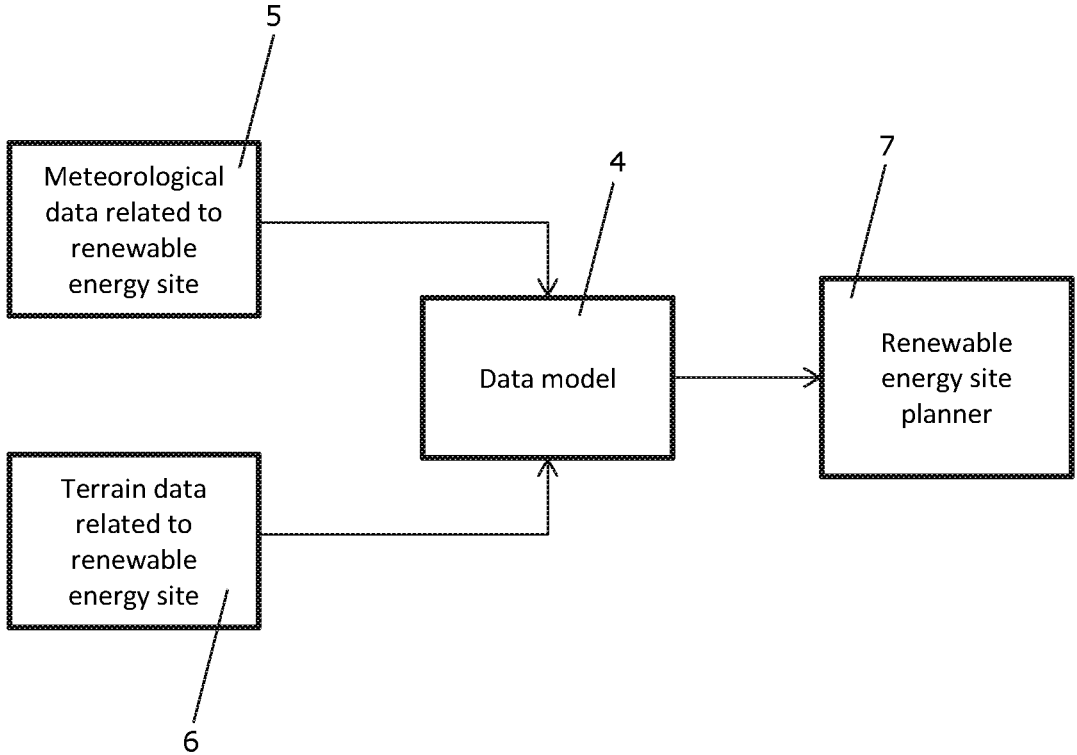
FIG. 2 is a block diagram illustrating a method according to an embodiment of the invention.

FIG. 2 is a block diagram illustrating a method according to an embodiment of the invention. A correlated set of meteorological data 5 and terrain data 6 related to a candidate renewable energy site is provided to a data model 4. The data model 4 could, e.g., be the data model 4 which is illustrated in FIG. 1 and described above. The terrain data 6 for the renewable energy site has a higher resolution than the meteorological data 5 for the renewable energy site. The resolution of the meteorological data 5 and terrain data 6 related to the renewable energy site may refer to a distance between spatial points within the renewable energy site where information has been obtained, or which the information relates to.

Thus, terrain data 6 with a higher resolution compared to the meteorological data 5 indicates a more detailed data set comprising more information regarding the physical features of the renewable energy site, compared to the information regarding the meteorological conditions of the renewable energy site.

As described above, with reference to FIG. 1, the trained data model 4 is suitable for identifying the coherence between meteorological data and terrain data relating to a geographical area. Thus, by feeding meteorological data 5 and terrain data 6 related to a renewable energy site to the trained data model, coherence between meteorological data 5 and terrain data 6 relating to this renewable energy site is obtained. The coherence may then be used for estimating meteorological data related to the renewable energy site with an increased resolution by downscaling, i.e. deriving data with increased resolution from data with low resolution, the meteorological data 5 for the renewable energy site.

The estimated meteorological data for the renewable energy site is provided from the data model 4 to a renewable energy site planner 7. The renewable energy site planner 7 plans the layout of the renewable energy site, i.e. planning the positions of renewable energy generating units in the renewable energy site, using the estimated meteorological data for the renewable energy site. The estimated meteorological data may give a detailed overview of the meteorological conditions in the renewable energy site, and can therefore be used when determining where it will be most suitable to position the renewable energy generating units within the site. This enables the planning of the layout of the renewable energy site in an optimal manner.

For instance, in the case that the renewable energy site comprises wind turbine generators, the renewable energy site may be planned in such a manner that the wind turbine generators have the optimal conditions for generating power from the wind.

In the case that the renewable power plant is a hybrid power plant comprising, e.g., wind turbine generators and photovoltaic cells, the renewable energy site may be planned in such a manner that each of the renewable energy generating units have the optimal conditions for generating power from the wind and sun.

Thereby, it may be ensured that the energy generating units of the renewable energy site may have optimal conditions for generating power.

Figure 3:
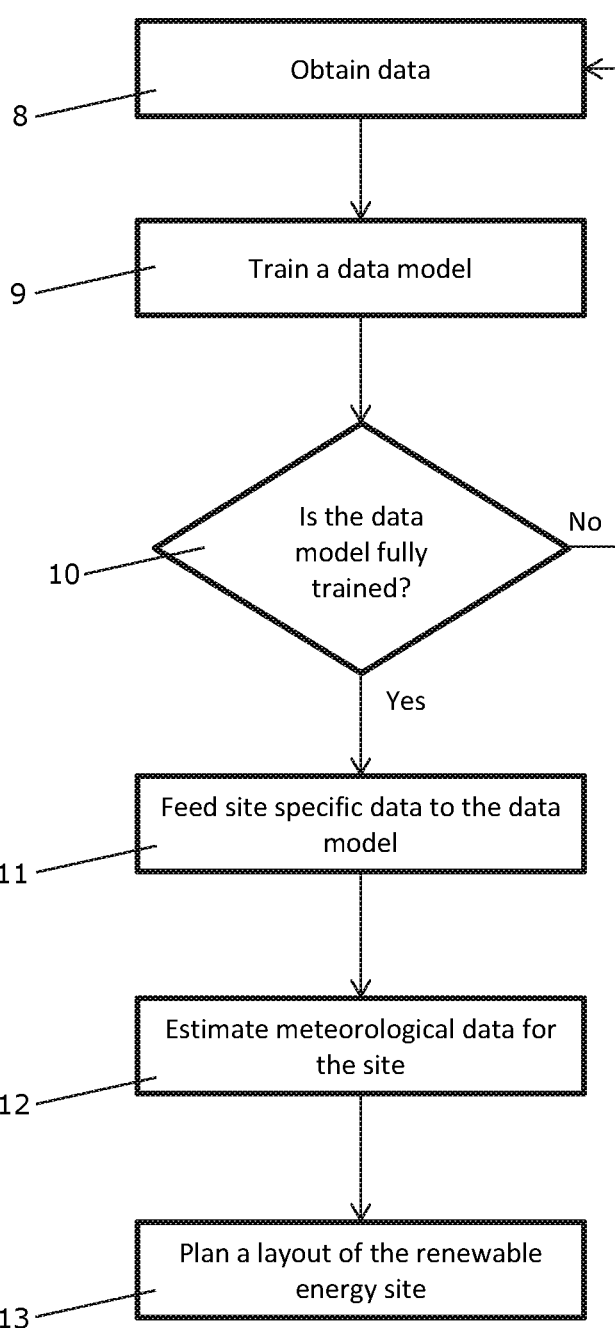
FIG. 3 is a flow chart illustrating a method according to an embodiment of the invention.

FIG. 3 is a flow chart illustrating a method according to an embodiment of the invention. The method is initiated at step 8, in which correlated sets of historical meteorological data and terrain data are obtained. Furthermore in step 8, the obtained data may be pre-processed, e.g. including cleaning data, preparation of data, assimilation of data, feature engineering, e.g. including selection of help function, attribute selection, etc. In step 9, a data model is trained on the basis of the obtained correlated sets of data, and using a deep learning algorithm. The data model may, e.g., be trained in the manner described above with reference to FIG. 1.

In step 10, it is investigated whether the data model is fully trained or not. In the case that the data model is not fully trained, the process is returned to step 8, and new correlated sets of data are obtained, and the training of the data model is repeated.

In the case that step 10 reveals that the data model is fully trained, the process is forwarded to step 11, where site specific data is fed to the data model. The site specific data may be a correlated set of meteorological data and terrain data relating to a candidate renewable energy site.

In step 12, meteorological data related to the renewable energy site with increased resolution is estimated for the renewable energy site by downscaling the site specific meteorological data, using the trained data model and based on the site specific data fed to the trained data model. The meteorological data with increased resolution may, e.g., be estimated in the manner described above with reference to FIG. 2.

In step 13, the layout of the renewable energy site is planned on the basis of the estimated meteorological data with increased resolution for the renewable energy site. The layout of the renewable energy site may, e.g., be planned in the manner described above with reference to FIG. 2. As an alternative, the estimated meteorological data with increased resolution may be applied in a pre-screening process for identifying suitable renewable sites among a number of candidate renewable energy sites.

Figure 4:
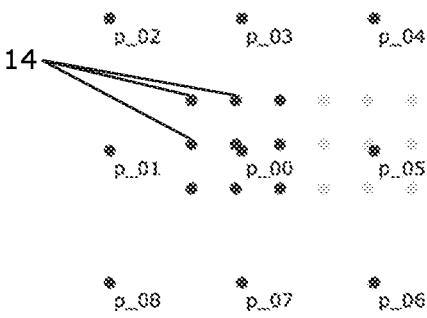
FIG. 4 is an example of downscaling a data set using a method according to an embodiment if the invention.

FIG. 4 is an example of downscaling a data set using a method according to an embodiment if the invention. FIG. 4 shows an example of downscaling data, illustrating data points, p_00 to p_08, and an estimated data point 14. The data points, p_00 to p_08, are measured data points, which could, e.g., be meteorological data related to a geographical area. A total of nine data points 14 are estimated around a closest data point, which in this case is p_00. The data points 14 are estimated by downscaling the data points, p_00 to p_08, using a trained data model. Thus, the nine data points 14 are estimated from nine measured data points, p_00 to p_08. The estimation may be performed in the manner described above with reference to FIGS. 1-3.

The invention claimed is:

1. A method for planning a layout of a renewable energy site, the method comprising:

obtaining, for at least one geographical area, correlated sets of historical meteorological data and terrain data, relating to the respective geographical area(s);

deriving a data model using a deep learning algorithm, and on the basis of the correlated sets of historical meteorological data and terrain data, by training the data model, the data model being adapted to identify coherence between meteorological data and terrain data relating to the same geographical area;

feeding site-specific meteorological data and site-specific terrain data related to the renewable energy site to the data model, the site-specific terrain data having a higher resolution than the site-specific meteorological data;

obtaining estimated meteorological data related to the renewable energy site with increased resolution by downscaling the site-specific meteorological data, using the trained data model, and based on the site-specific meteorological data and the site-specific terrain data fed to the data model;

planning the layout of the renewable energy site on the basis of the estimated meteorological data related to the renewable energy site with increased resolution; and constructing the renewable energy site in accordance with the layout of the renewable energy site.

2. The method of claim 1, wherein the obtaining terrain data comprises obtaining elevation data.

3. The method of claim 1, wherein the obtaining terrain data comprises obtaining roughness data.

4. The method of claim 1, wherein the historical meteorological data comprises high resolution historical meteorological data.

5. The method of claim 1, wherein the terrain data comprises high resolution terrain data.

6. The method of claim 1, wherein the historical meteorological data is in the form of one or more time series.

7. The method of claim 1, further comprising estimating an energy production of the renewable energy site based on the estimated meteorological data with increased resolution for the renewable energy site and based on the layout of the renewable energy site.

8. The method of claim 1, further comprising:

operating the renewable energy site for a predefined time period;

obtaining additional meteorological data during the renewable energy site during the predefined time period;

feeding the additional meteorological data obtained during the predefined time period to the data model;

obtaining additional estimated meteorological data related to the renewable energy site and to the predefined time period with increased resolution by downscaling the additional meteorological data using the data model, and based on the site-specific terrain data previously fed to the data model; and estimating an expected energy production of the renewable energy site for the predefined time period, based on the additional estimated meteorological data with increased resolution for the renewable energy site for the predefined time period.

9. The method of claim 1, wherein the renewable energy site comprises at least one wind turbine generator.

10. The method of claim 1, wherein the deep learning algorithm comprises one or more help functions for deriving the data model, the one or more help functions being adapted to provide information regarding a vector field defined by the historical meteorological data.

11. The method of claim 1, wherein the meteorological data comprises wind data and/or solar influx data.

12. The method of claim 1, wherein the deep learning algorithm comprises convolutional network models, recurrent neural networks, generative adversarial network models and/or feed forward models.

13. The method of claim 1, wherein the correlated sets of historical meteorological data and terrain data are obtained from at least two different geographical areas.

14. A method for identifying a renewable energy site, the method comprising:

obtaining, for at least one geographical area, correlated sets of historical meteorological data and terrain data, relating to the respective geographical area(s);

deriving a data model using a deep learning algorithm, and on the basis of the correlated sets of historical meteorological data and terrain data, by training the data model, the data model being adapted to identify coherence between meteorological data and terrain data relating to the same geographical area;

feeding site-specific meteorological data and site-specific terrain data related to at least one geographical area to the data model, each geographical area comprising at least one candidate renewable energy site, the site-specific terrain data having a higher resolution than the site-specific meteorological data;

obtaining estimated meteorological data related to the geographical area(s) with increased resolution by downscaling the site-specific meteorological data, using the data model, and based on the site-specific meteorological data and the site-specific terrain data fed to the data model;

identifying at least one suitable renewable energy site within the at least one geographical area on the basis of the estimated meteorological data related to the geographical area(s) with increased resolution; and estimating an energy production of the renewable energy site based on the estimated meteorological data with increased resolution for the renewable energy site and based on the layout of the renewable energy site.

15. The method of claim 14, wherein the obtaining terrain data comprises obtaining at least one of elevation data or roughness data.

16. The method of claim 14, wherein the terrain data comprises high resolution terrain data.

17. The method of claim 14, wherein the historical meteorological data comprises high resolution historical meteorological data.

18. The method of claim 14, wherein the historical meteorological data is in the form of one or more time series.

19. The method of claim 14, further comprising:

constructing the renewable energy site in accordance with the layout of the renewable energy site.

20. The method of claim 19, further comprising:

operating the renewable energy site for a predefined time period;

obtaining additional meteorological data during the renewable energy site during the predefined time period;

feeding the additional meteorological data obtained during the predefined time period to the data model;

obtaining additional estimated meteorological data related to the renewable energy site and to the predefined time period with increased resolution by downscaling the additional meteorological data using the data model, and based on the site-specific terrain data previously fed to the data model; and estimating an expected energy production of the renewable energy site for the predefined time period, based on the additional estimated meteorological data with increased resolution for the renewable energy site for the predefined time period.

* * * * *